Patented Jan. 31, 1939

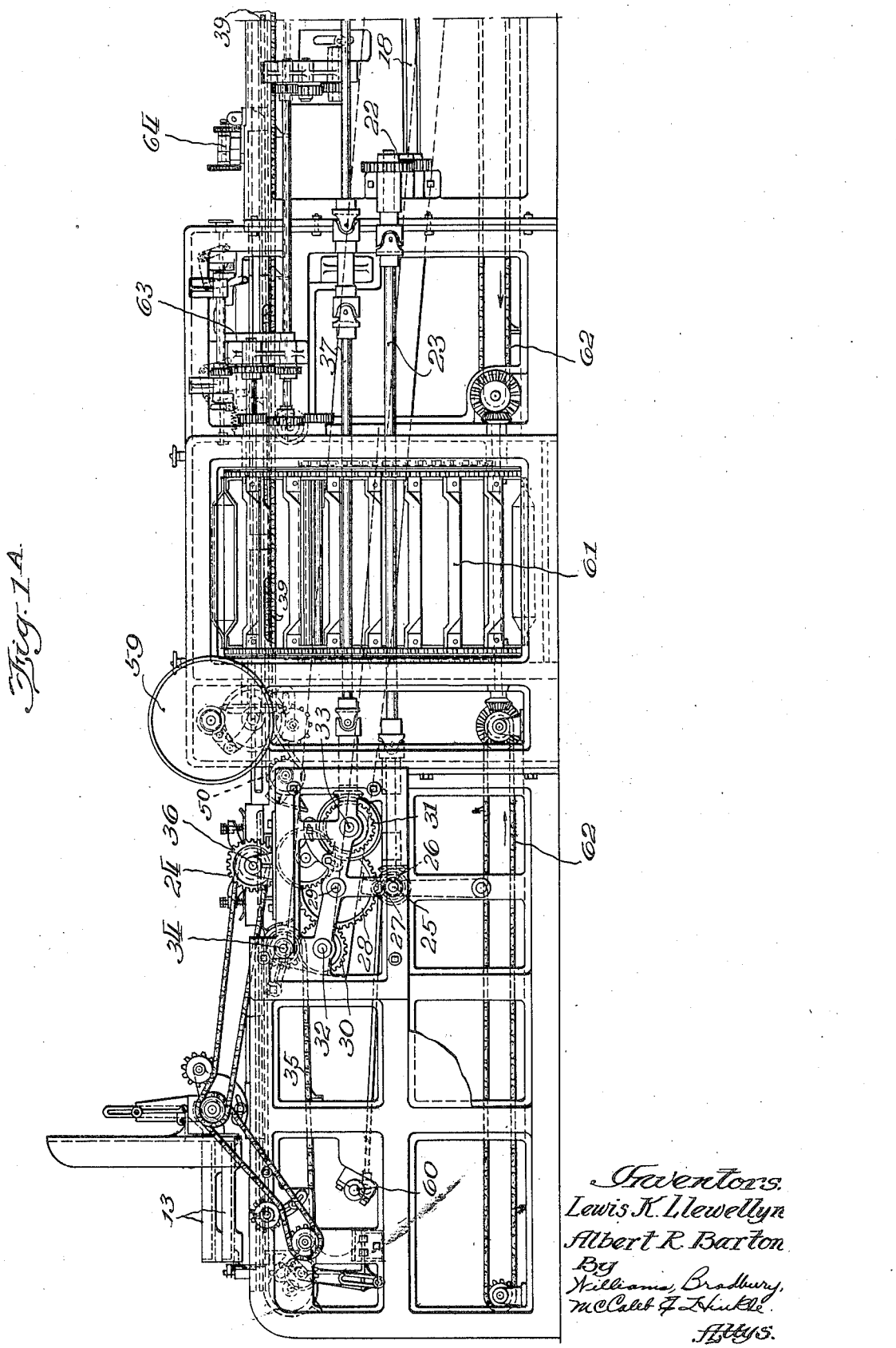

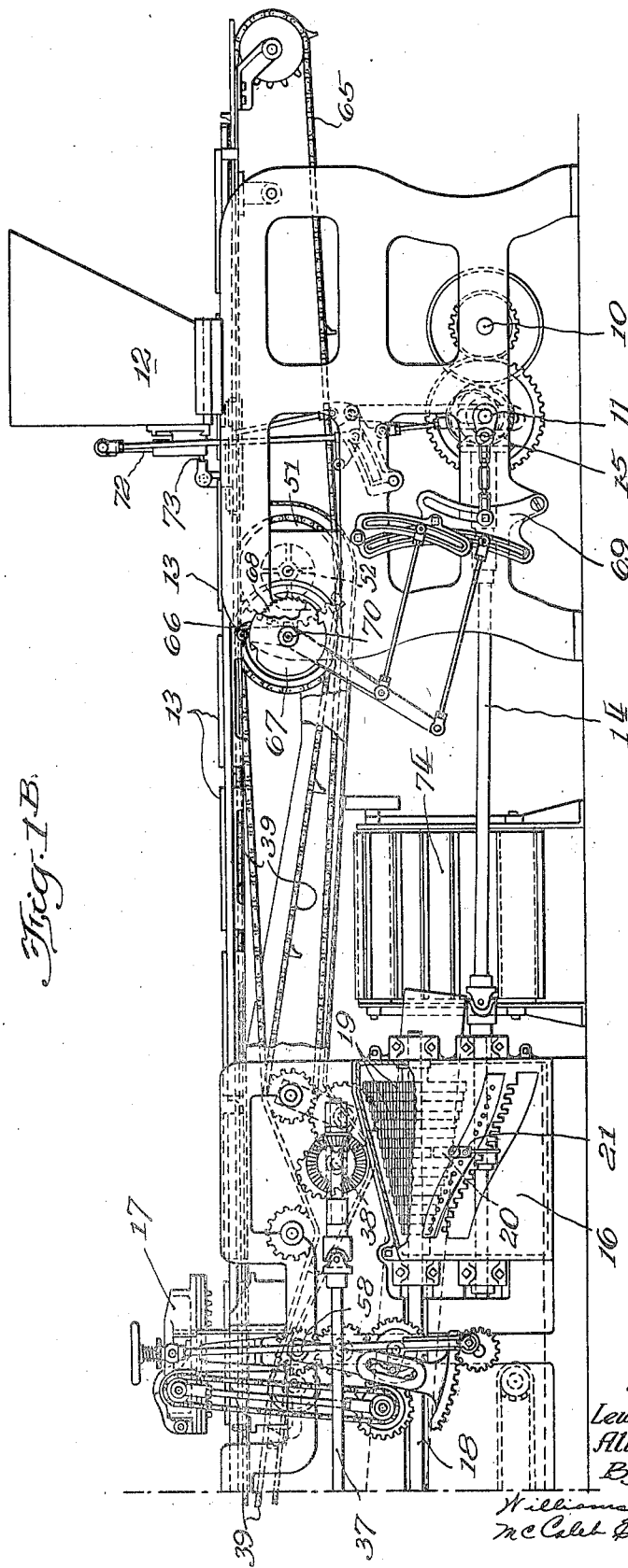

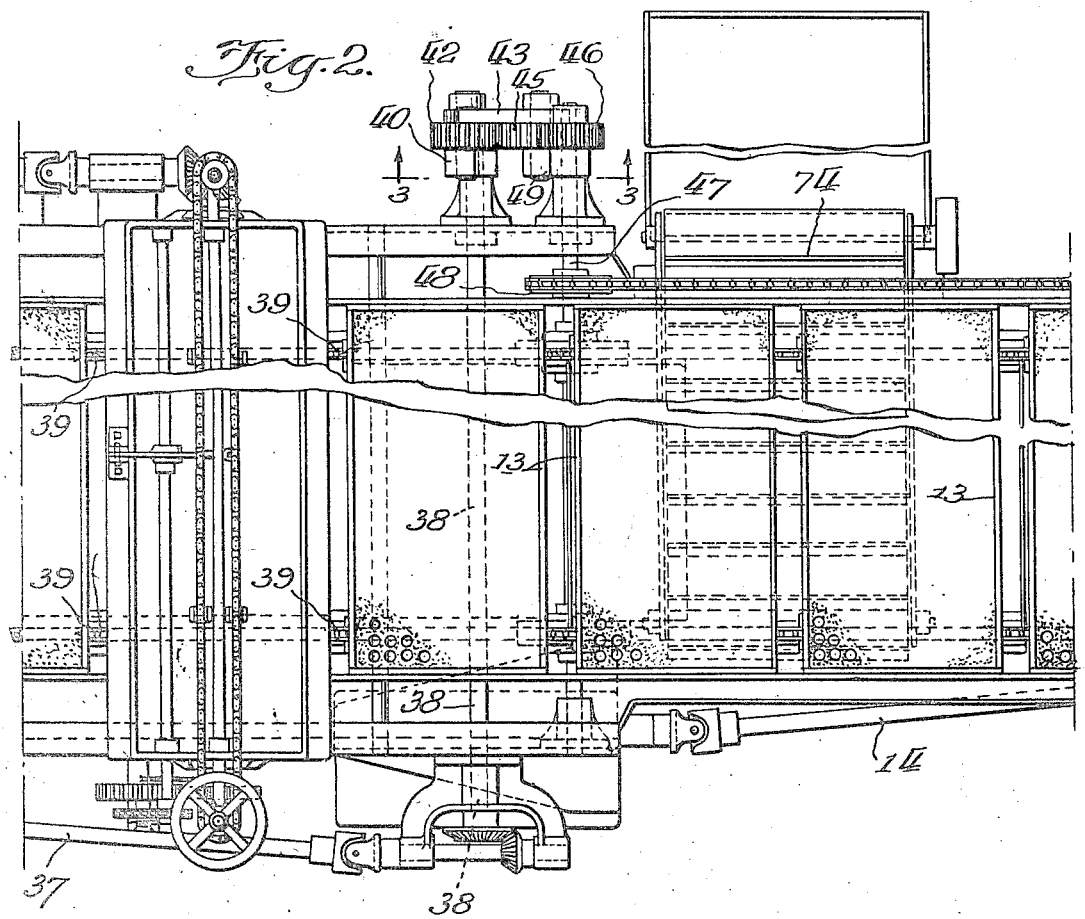
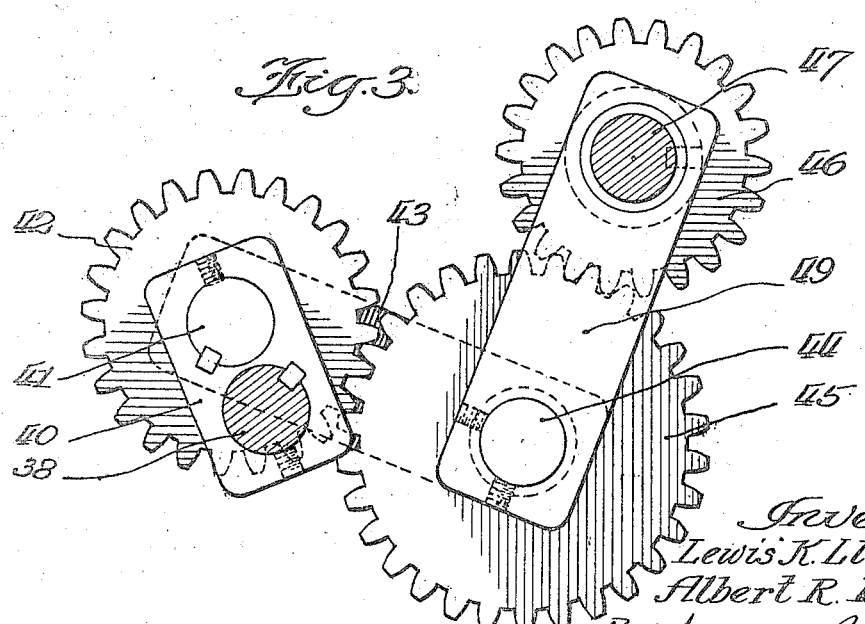

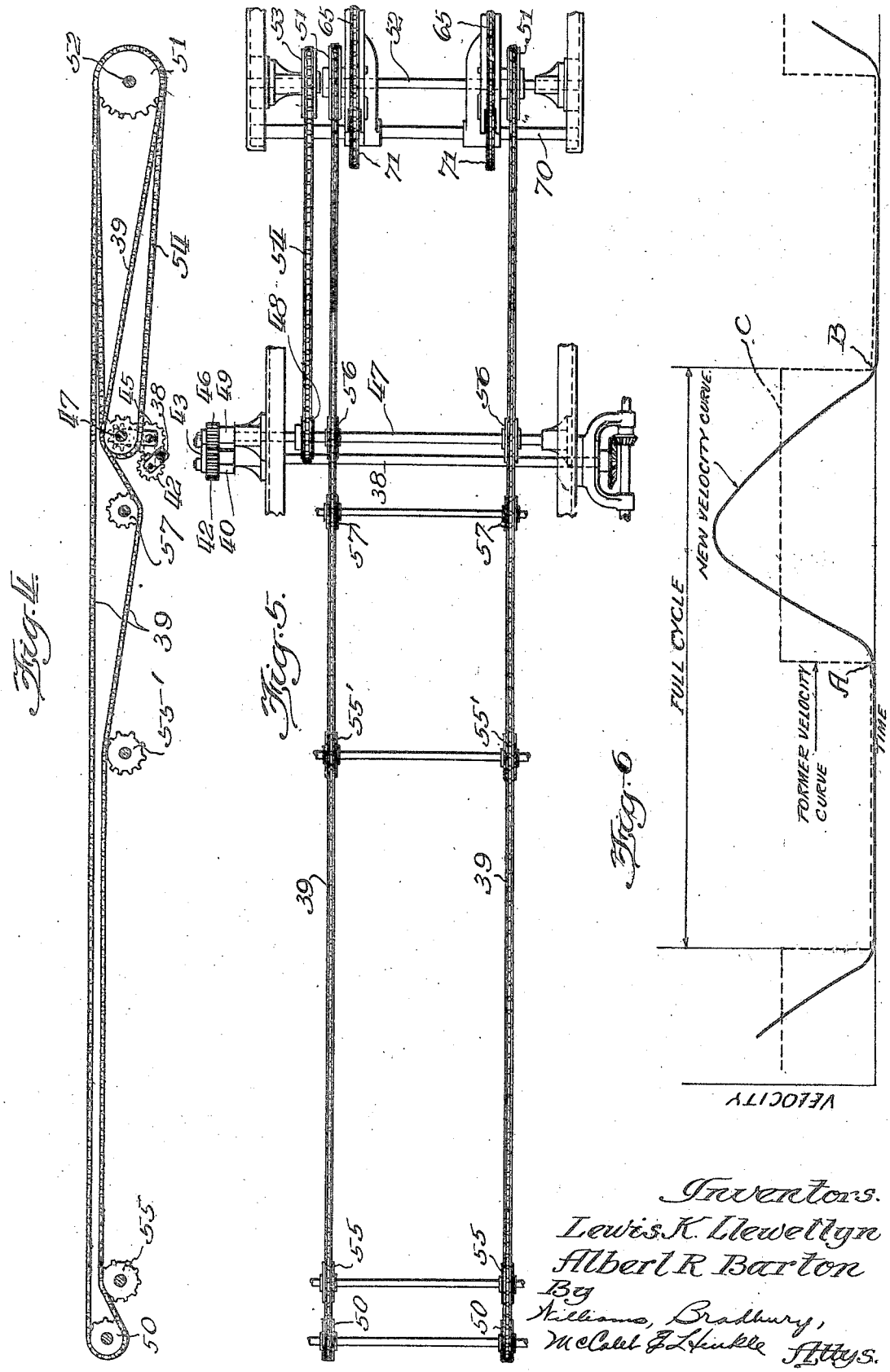

2,145,399

UNITED STATES PATENT OFFICE 2,145,399

CONFECTIONERY MOLDING MACHINE

Lewis K. Llewellyn, Evanston, and Albert R. Barton, Oak Park, Ill., assignors to E. J. Brach & Sons, Chicago, Ill., a corporation of Illinois Application July 8, 1936, Serial No. 89,509

4 Claims. (Cl. 107—8)

This invention relates to machines for automatically molding confectionery and similar items from congealable or hardening material.

The invention will be described in connection with a machine which is supplied seriatim with trays containing starch or other suitable molding material and congealed or hardened confectionery or the like, which trays are dumped, the contents are separated, the candies or confectionery pieces are cleaned and withdrawn, the starch is replaced in the trays and leve'ed off, impressions or recesses having the desired form are made in the starch, these recesses are filled with a measured quantity of confectionery material in plastic condition and the trays are delivered from the machine to permit the confectionery material to set, whereafter the trays are again passed through the machine to remove the set candies or confectionery therefrom.

The present invention relates more particularly to the conveying system whereby the trays are transported from the position of one operation to another and the principal object of the invention is to provide a conveying system which operates intermittently and which, nevertheless, accelerates and decelerates gradually so that any possibility of disturbing the starch which forms the molded openings, is obviated.

The invention will readily be understood from the following description of a preferred embodiment thereof, taken in conjunction with the accompanying drawings, in which:

Fig. 1A is an elevation of the fore part of a machine embodying my invention;

Fig. 1B is an elevation of the rear part of the machine;

Fig. 2 is a plan view of an intermediate portion of the machine;

Fig. 3 is a sectional view on a larger scale, taken on the line 3—3 of Fig. 2, showing the speed varying linkage;

Fig. 4 is a diagrammatic elevation showing portions of the main conveyor chains and the drive therefor;

Fig. 5 is a diagrammatic plan view showing the drive of the main conveyor chains, and Fig. 6 is a graph showing the manner in which the main chains are actuated.

The main driving mechanism for the several parts of the machine will first be described. The main power shaft 10 is connected by spur gears to the driving shaft 11 of the depositor 12. This depositor works continuously with a reciprocating motion so as to fill a row of recesses in the starch of a tray 13. A shaft 14 is driven from the shaft 11 by beveled gearing 15. The shaft 14 extends to a selective gear drive 16 located near and below the printer 17. A shaft 18, mounted above the shaft 14, has fixed thereon a number of gears 19 of graded sizes. The shaft 14 is operatively connected to a selected one of the gears 19 by means of a gear 20 which is movably mounted on a handle 21. By suitable manipulation of the handle 21, the speed ratio between the shafts 14 and 18 may be controlled as desired, for a purpose which will hereinafter appear.

The shaft 18 drives through a gear connection 22 a shaft 23 which extends to a point immediately below the rotary dumper 24. A short transverse shaft 25 is driven from the shaft 23 through miter gears 26. A pinion 27 on the shaft 25 drives a gear 28 which is rigidly carried by a shaft 29. A mutilated gear which has teeth around half its periphery only is rigidly mounted on the shaft 29 behind the gear 28. The mutilated gear cooperatively engages two pinions 30 and 31 arranged in diametrically opposite positions with respect to the mutilated gear. Consequently, these pinions are rotated alternately in the same direction. The pinions 30 and 31 are rigidly mounted on shafts 32 and 33 respectively.

The shaft 32 drives through suitable gearing a shaft 34 which is the drive for the first set of conveyor chains 35. The shaft 33 drives through suitable gearing the shaft 36 of the tray dumper 24. The trays may be supplied to the chains 35 by any suitable means. We prefer to employ the unstacking machine described and claimed in our copending application Serial No. 37,662, filed August 24, 1935 and issued Aug. 10, 1937, as Patent No. 2,089,385. This machine may suitably be driven from the shaft 36 so that a tray is placed on the chains 35 while they are at rest and while a tray is being dumped by the dumper 24. Then the chains 35 move to bring the tray which it has just received to the dumper and insert a previous tray into the dumper. This alternate operation results from the fact that the gears 30 and 31 operate alternatively owing to the construction of the mutilated gear 28.

A shaft 37 is driven from the shaft 33, and consequently intermittently. The shaft 37 drives a shaft 38 which is the main drive shaft of the principal conveyor chains 39. The shaft 38 extends transversely through the machine and has rigidly secured thereto a radial arm 40. To this arm is keyed a pin 41 which rigidly carries a gear 42. Thus, it will be understood that the gear 42 rotates in planetary relation to the shaft 38, but does not rotate relative to the shaft 38 or to the pin 41. The pin 41 pivotally receives a link 43, which supports a pin 44 on which is freely mounted a gear 45 in mesh with the gear 42 and with a gear 46. The gear 46 is rigidly mounted on a shaft 47 which extends across the machine and has keyed thereto a sprocket 48. The shaft 47 is connected to the pin 44 by a link 49 to keep the gears 45 and 46 in mesh. It is to be understood that the pin 44 is connected to the links 43 and 49 so as to provide free articulation therebetween.

If the shaft 38 is rotated continuously, the shaft 47 will be driven at a varying speed. The speed of the shaft 47 will vary from zero up to a maximum which is substantially greater than the speed of the shaft 38, and will then vary down to zero again. The speed of the shaft 47 is shown graphically on Fig. 6 between A and B. The arm 40 of the variable speed linkage is connected with the shaft 38 so that the linkage is in zero position at the moment the shaft 38 is arrested by the disengagement of the teeth of the mutilated gear 28 from the gear 31, from which the shaft 38 is driven. It will be understood that the shaft 38 is driven one revolution at constant speed, corresponding to the dotted line C on Fig. 6, and is then at rest for a similar period of time. As a result of the correct position of the arm 40 on the shaft 38, the shaft 47 rotates with the characteristic speed cycle shown in Fig. 6. In other words, the shaft 47 remains at rest for a period owing to the similar condition of the shaft 38. The shaft 38 is then put into rotation at immediate full speed, as shown by dotted lines in Fig. 6. Owing to the fact that the variable speed gear elements are at their zero position, the shaft 47 starts imperceptibly and accelerates gradually to a peak speed. Then it decelerates gradually and finally stops imperceptibly.

As a consequence of the imperceptible starting and stopping and the gradual acceleration and deceleration of the chains 39, the starch in the trays is not subjected to the shocks which have heretofore broken down the walls of the molds and resulted in the production of imperfect candies or sweetmeats.

The chains 39 are best shown in Figs. 4 and 5. They pass over sprockets 50 near the dumper 24 and over sprockets 51 keyed to a shaft 52 near the depositor 12. The shaft 52 rigidly carries a sprocket 53 which is driven from the gear 48 on the shaft 47 by means of a chain 54. The lower stretch of the chains 39 is supported by idlers 55, 55' and 56, the latter being freely mounted on the shaft 47, and they pass beneath idlers 57 whereby their tension may be adjusted as desired.

The printer 17 is well known and need not be described in detail. It serves to make depressions in the starch of the tray, which depressions receive a certain amount of confection in plastic state from the depositor 12. The printer 17 operates when the chains 39 are at rest and, consequently, its driving shaft 58 is driven by connections (not shown) from the gear 30.

The machine comprises various mechanisms which are not necessarily operated in synchronism with the chains 39. These mechanisms may suitably be driven from a pulley 59 and they will be but briefly referred to. From the pulley 59 is operated a shaft 60 which serves to vibrate a sieve (not shown) which separates the finished sweetmeats from the starch. Various other features, such as the brush to clean the sweetmeats, a fan to supply air to the brush to assist in the cleaning, and so forth, are not shown, but they may be conveniently driven from the pulley 59 in known manner. Also driven from the pulley 59 is the starch elevator 61 and also the starch scrapers 62 which return any starch which falls to the bottom of the machine to the elevator 61. Leveling means referred to generally by the reference numeral 63 serve to remove excess starch from the trays. This leveling means may operate continuously and may also be driven from the pulley 59.

It will be understood that the trays are brushed in known manner, the short sides being brushed by stationary brushes (not shown) and the longer sides being brushed by a traveling brush driven by the mechanism 64. The traveling brush operates when the chains 39 are at rest and, consequently, the mechanism 64 is driven from the shaft 32.

The trays are carried past the depositor 12 by conveyor chains 65 which are located at the delivery end of the chains 39, the chains 39 and 65 being located in overlapping relation. It may here be noted that the chains 35, 39 and 65 are provided with lugs which engage the trays. The trays normally ride upon runways in which the upper stretches of these chains are recessed. The chains 65 are driven intermittently from the shaft 11 by means of two pawls located one behind the other, the foremost pawl being seen in Fig. 1B and being designated 66. The pawl 66 cooperates with a disc 67 which has two diametrically opposite notches. The other pawl cooperates with a ratchet 68 located behind the disc 67 in Fig. 1B. The throw of this pawl can be adjusted in known manner with the aid of the adjustable connecting element 69. This adjustable element, together with the variable speed gear box 16, enables each movement of the chains 65 to be adjusted to suit it for any suitable number of rows of openings which may be formed by the printer 17. That is, where small sweetmeats are being made, the rows of molds or openings are located in rows which are much closer than when larger sweetmeats are being made. The pawl 66 engages the notches of the disc 67 only to move the chains 65 a greater distance corresponding to the distance between the last row of molds of one tray and the first row of molds of the next tray. After this big movement the chains 65 are moved by the other pawl through the shorter distance corresponding to the distance between adjacent rows of molds. The disc 67 and ratchet 68 are rigidly mounted on the shaft 70 which has keyed thereto two sprockets 71 for the actuation of the chains 65.

The depositor 12 which supplies a charge of liquid or plastic confectionery material to each mold opening need not be described in detail. It is driven from the shaft 11 and it comprises a series of pistons 72 and cut-off elements 73. Suitable adjustments are provided whereby the amount of liquid material delivered by each piston 72 may be readily controlled. The trays delivered from the depositor by the chains 65 may be removed therefrom in any suitable way, for example, by means of the transferring and stacking mechanism described and claimed in Patent No. 1,950,943, Joseph M. Hutchinson.

The reference numeral 74 designates a suitable conveyor for the removal of the hardened cleaned sweatmeats delivered from the machine.

Although the invention has been disclosed in connection with the specific details of a preferred embodiment thereof, it must be understood that such details are not intended to be limitative of the invention except in so far as set forth in the accompanying claims.

Having thus described our invention, what we claim as new and desire to secure by Letters Patent of the United States is:

1. In a machine for molding confectionery and the like, a conveyor for conveying fragile molds in which confectionery is to be molded in step by step movements, an intermittently operated drive member, and a varying speed linkage connecting said drive member to said conveyor, said varying speed linkage having a cycle from zero speed to peak speed and back to zero speed when driven continuously, said intermittently operated drive member being connected to the varying speed linkage so that the starting and stopping position of the former coincide with the zero position of the latter.

2. In a machine for molding confectionery and the like, a conveyor, including an actuating shaft, for conveying fragile molds in which confectionery is to be molded in step by step movements, an intermittently driven shaft, a gear rigidly and eccentrically mounted thereon, a gear on said actuating shaft, a floating gear engaging said gears, and links securing the intermediate gear to said shafts, said gears and links being arranged so that the continuous rotation of the intermittently driven shaft imparts a varying speed cycle including a zero point to the actuating shaft and the conveyor, the gear mounted on the intermittently driven shaft being located so that the stopping and starting of said shaft coincides with the zero point of the speed cycle of the actuating shaft.

3. In a machine for molding confectionery and the like, a conveyor, having a shaft, for conveying fragile molds in which confectionery is to be molded in step by step movements, another shaft, means for rotating said other shaft one revolution at intervals, and a varying speed device having a zero speed in its cycle, connecting said shafts to impart a corresponding one revolution to the conveyor shaft, said varying speed device being connected to the intermittently driven shaft so that its zero speed position corresponds to the starting and stopping position of said intermittently driven shaft.

4. In a machine for molding confectionery and the like, a conveyor, including an actuating shaft, for conveying fragile molds in which confectionery is to be molded, in step by step movements, a driving shaft, means for rotating the driving shaft one revolution at intervals, a gear rigidly and eccentrically mounted on the driving shaft, a gear of the same size on said actuating shaft, a floating gear engaging said gears, and links securing the intermediate gear to said shaft, said gears and links being arranged so that continuous rotation of the driving shaft imparts a varying speed cycle including a zero point to the actuating shaft and the conveyor, the gear mounted on the intermittently driven shaft being located so that the stopping and starting of said shaft coincides with the zero point of the speed cycle of the actuating shaft.

LEWIS K. LLEWELLYN.
ALBERT R. BARTON.